July 26, 1949.
T. H. STORY
2,477,214
ELECTRODE STRUCTURE FOR HIGH-FREQUENCY SEALING
OF THIN THERMOPLASTIC SHEET MATERIAL
Filed Jan. 31, 1948
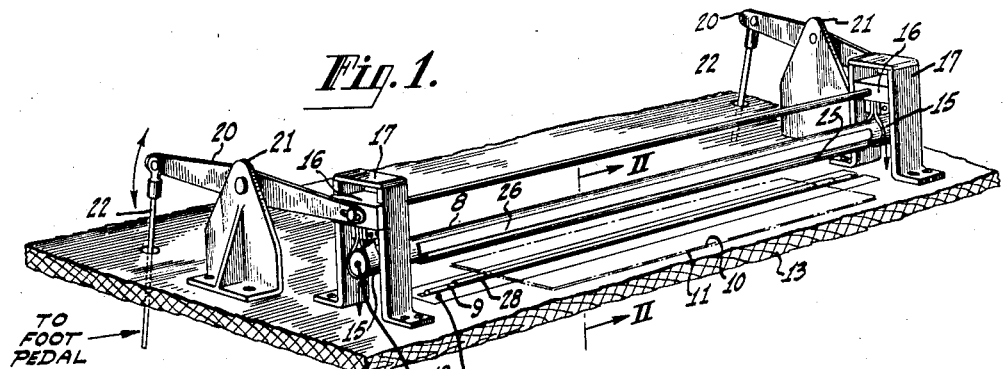
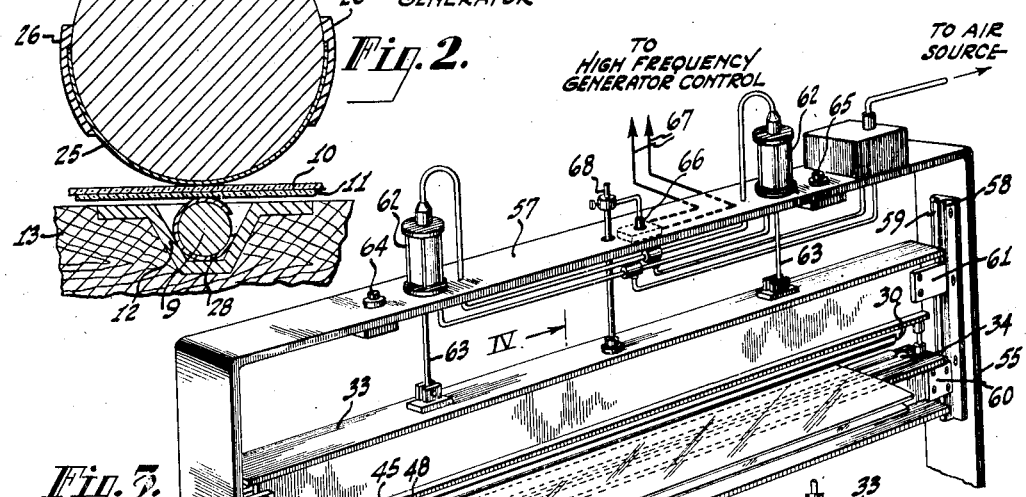
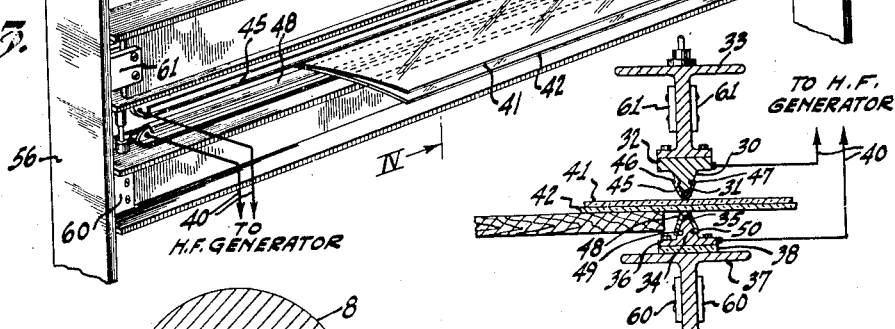
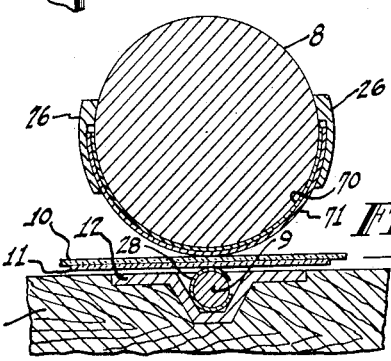
INVENTOR
THEODORE H. STORY
BY
ATTORNEY Patented July 26, 1949

2,477,214

UNITED STATES PATENT OFFICE 2,477,214

ELECTRODE STRUCTURE FOR HIGH-FREQUENCY SEALING OF THIN THERMOPLASTIC SHEET MATERIAL

Theodore H. Story, Merchantville, N. J., assignor to Radio Corporation of America, a corporation of Delaware Application January 31, 1948, Serial No. 5,543

9 Claims. (Cl. 219—47)

The present invention relates to an electrode structure for high frequency sealing of thin thermoplastic sheet material, and has for its primary object to provide an improved electrode structure and arrangement for effectively applying high frequency energy to thin, large sheets of thermoplastic material for heating and uniformly uniting such sheets in narrow areas of substantially linear dimensions of considerable length.

Difficulty has been encountered heretofore in obtaining uniform long seals or seams between relatively large sheets of thin thermoplastic material. With presently known electrodal structures and arrangements such material may not seal uniformly throughout the length of long electrodes and often may fail to seal between the ends of such electrodes.

Attempts have been made heretofore to provide uniform linear high frequency sealing between two large sheets of thermoplastic material or between two layers of thermoplastic material requiring sealing along a line of several feet in length, including making the electrode structure of massive proportions and with carefully machined edges or faces for applying uniform pressure throughout the length of the sealing area. Results have generally been unsatisfactory for the reason that in spite of the massive dimensions and structural rigidity provided, the electrode faces appeared to warp away from the material at the ends of the weld or seam, causing unsatisfactory joining of the materials, spoilage and increased production costs.

With thin thermoplastic sheets of normal 4 mil thickness, for example, tests on an electrode structure of several feet in length have shown that the electrodes, even if in the form of heavy channel beams having a high degree of rigidity against deformation, may warp away from the material a distance of the order of 9 mils at the ends. This is more than the total thickness of the two 4 mil sheets to be joined, thereby preventing the application of pressure uniformly to the material, particularly after the interfaces or linear junction of the sheets becomes softened enough by heating to unite or weld. This action appears to be due to the fact that heat generated in the plastic is conducted to a thin surface area of the bar or electrode in contact with the material, causing it to expand, thus warping the electrode or bar away from the material.

It is a further object of this invention, therefore, to provide an improved electrode structure for high frequency sealing of thin thermoplastic sheet material which is not subject to unequal heating and warpage in operation, thereby to provide more uniform sealing or welding of long seams with such sheet material.

It is also an object of this invention, to provide an improved electrode structure or electrode, for high frequency sealing or welding of thin thermoplastic sheet material, which is effective to provide uniform sealing pressure and heat over areas of substantially linear dimensions and of extended length, thereby to produce a uniform linear seam or seal between such sheets to unite them over any desired length.

It is a still further object of this invention, to provide an improved high frequency heating electrode which permits expansion and contraction of the effective heating surfaces thereof, without warping the electrode, whereby linear contact may be maintained with the work during the welding or sealing operation to insure uniform linear seams or seals of extended length.

It is an object of this invention, also, to provide an R.-F. heating electrodal arrangement providing elongated bar electrodes for engaging and holding thermoplastic sheet material therebetween for uniting the same by sealing over areas of substantially linear dimensions and of considerable length, which provides for uniform heating of the effective electrode faces and free expansion thereof while being held in contact with the material and which confines the heating to such electrode faces until the seal or seam has been completed, thereby preventing distortion of the electrodes per se.

An effective non-warping electrode for high frequency heating and sealing of thin thermoplastic sheet material may be provided, in accordance with the invention, by forming the electrode face with a thin metal strip or cover between the material being sealed and the main body of the electrode which is of elongated bar form. The cover strip of metal is retained against the electrode by pressure contact whereby an electrical connection is established throughout the length of the electrode with the metal strip. The connection between the strip and the electrode proper is further arranged to permit expansion and contraction of the strip substantially in all directions independently of the electrode proper.

The speed of the heat seal is greater than the speed of the heat travel through the protective coating, whereby the electrode face is maintained relatively cooler during the substantially instantaneous welding operation and presents a surface to the seam which is uniform. The electrode may receive the heat by conduction from the protective cover after the seal is completed and dissipates the heat by radiation so that any warpage which occurs is not effective to impair the seal. In operation, the time of welding may occupy an interval of the order of $\frac{1}{10}$ of a second and the subsequent operation in removing the sealed sheets and replacing them with new material for sealing may occupy a period of the order of from 5 to 10 seconds, which has been found to be sufficient time for the electrodes to cool and be restored to their normal form at the operating edge.

Therefore the protective cover permits continuous normal operation of the device regardless of the heat developed at the weld since the heat at the instant of welding is prevented from flowing to the electrode proper.

The invention will, however, be further understood from the following description, when considered in connection with the accompanying drawing, and its scope will be pointed out in the appended claims.

In the drawing:

Figure 1 is a view in perspective of apparatus for high frequency heating and sealing of thin thermoplastic sheet material provided with electrodes and electrodal arrangement embodying the invention, Figure 2 is a cross-sectional view, on a greatly enlarged scale, of the apparatus of Figure 1 taken on the section line II—II, further illustrating certain details of the embodiment of the invention shown in Figure 1, Figure 3 is a view in perspective, of high frequency sealing or welding apparatus provided with electrodes and an electrode arrangement embodying the invention, being a modification of the invention as shown in Figures 1 and 2, Figure 4 is a cross-sectional view, taken on the line IV—IV of Figure 3, further illustrating certain details of the modification of the invention as shown in Figure 3, and Figure 5 is a further cross-sectional view of an electrode arrangement as shown in Figures 1 and 2, also on an enlarged scale and substantially full size, showing a further modification of the invention.

Referring to Figures 1 and 2, a pair of elongated bar electrodes 8 and 9 are arranged in substantially axially parallel relation to each other and adapted to move relatively toward and away from tangential engagement with each other in such parallel relation and to engage and hold two sheets 10 and 11 of thin thermoplastic material between them and to apply pressure thereto on opposite sides thereof along a common line through which a seam or seal is desired between said sheets.

In the present example, the electrode 9 lies in a metallic trough 12 imbedded in and flush with the top of a supporting structure or table 13. The electrode 9 is thereby fixed in location with respect to the electrode 8 which is arranged to be movable with respect thereto in a vertical direction as shown more fully in Figure 1, in which the thermoplastic sheets 10 and 11 are represented in outline form for sake of clarity in viewing the relation of the electrode 9 to the electrode 8.

The electrode 8 is suspended at each end in insulating saddles or straps 15 suspended from flanged blocks 16 which are movable in a vertical direction in inverted U-shaped frames 17 mounted on the table 13, one at each end of the fixed electrode channel. The frames 17 are so positioned furthermore that the vertical movement of the blocks 16 causes the electrode 8 to move in substantially parallel relation to the electrode 9 toward and away from it and to be lowered into position as shown in Figure 2.

It will be seen that the electrodes are in tangential contact with the sheets 10 and 11 to be joined, the one directly above the other along a common line of contact between said sheets, whereby a linear weld or seam may be provided when high frequency energy of the proper intensity or voltage is applied to the electrodes through supply leads indicated at 19 and connected with the electrodes as shown. In this arrangement the electrode 9 is the grounded electrode while the electrode 8 is the high potential electrode.

Any suitable arrangement may be provided for moving the electrodes relatively in parallel relation to engage the thermoplastic sheets. In the present example, the blocks 16 are controlled by levers indicated at 20 which are pivoted on standards 21 secured to the table 13 and controlled by suitable foot pedal rods as indicated at 22 for raising and lowering the blocks and the electrode 8 by movement thereof as indicated by the arrows.

It will be noted that the electrode 8 is of relatively large cross section whereby it may be made several feet in length with a required degree of rigidity and with a degree of uniform linearity along its contact surface with the material to be welded. This is for the reason that it is suspended between its ends in the insulating saddles 15 and must be prevented from any appreciable sagging or bending at the middle by reason of its own weight.

The relatively large cross sectional area also provides sufficient weight to apply a desired pressure to the sheet material to be welded when the electrode is lowered into contact therewith, as shown in Figure 2, whereby the materials are firmly pressed together completely along the full line of contact desired to initiate a uniform seam or seal when high frequency current is applied to the electrodes.

It will also be noted that the lower electrode 9 may be of relatively smaller diameter by reason of the fact that it is maintained uniformly rigid and substantially linear along its length of contact with the material by reason of the fact that it is supported throughout its length in the metallic trough 12 which in turn is supported by the table structure 13.

The lower face of the electrode 8 is covered by a thin curved metallic strip 25 which conforms to and contacts with the electrode throughout its length, being thereby interposed between the face of the electrode and the work. The metallic strip 25 may comprise a thin strip of copper of 5 mils thickness, for example, applied uniformly in contact with the electrode face over the active length thereof and held in place in firm contact with the electrode by means of two substantially diametrically opposite metallic guide plates or strips 26 secured to the electrode 8 and extending along the active length of the electrode 8 as shown, in spaced relation thereto to provide fixed guides for engaging and holding the lateral edges of the strip 25 as indicated in Figure 2.

The thin metallic strip 25 heats uniformly across its thickness and is free to expand in all directions while being held in contact with the material being sealed by the weight of the electrode. With this arrangement it has been found that the electrode, per se, does not obtain heat from the thin strip until the seal has been completely welded. Therefore, the electrode is prevented from heating along its surface of contact at the instant of welding and is thereby prevented from expanding at the outer surface and warping out of contact with the material.

In a practical application of the invention using a device as shown in Figure 1, and an electrode arrangement as described and shown, a uniform seal may be obtained between two 4 mil sheets of thermoplastic material of four feet or more in length during which operation a surface gauge applied to the electrode ends shows a deflection of the order or 2 mils of less.

In a similar manner, the lower electrode 9 is covered over its contact surface by a thin strip 28 of suitable metal such as copper of 5 mils thickness rolled around the electrode, as shown in Figure 2, with the edges of the strip out of contact for permitting expansion and contraction. It will be noted that the diameter of the electrode 9 and its metallic covering is such that the overall diameter is slightly greater than the depth of the channel or trough, whereby the plastic sheets are supported entirely by the electrode 9 along the line of welding, entirely out of contact with the table or support.

From the foregoing description it will be seen that a thin metallic protective cover is applied to an elongated bar electrode in uniform contact therewith over its working surface or line of contact with the material to be welded. The working surface or line of contact of the electrode with the work is, therefore, separate from the electrode proper and is freely deformable or adapted to expansion and contract uniformly in all directions in the presence of heat due to the welding operation and, therefore, imparts no stress to or strain in the electrode proper whereby it is caused to warp and to vary the contact pressure of the work. In this manner uniform seams or welds are obtainable, thereby increasing the quantity and improving the quality of the product and lowering its cost of production.

The edges of the electrode cover are likewise held by the guide strips which provide sufficient depth to permit free expansion while at the same time restraining the thin cover sheet to uniform contact with the electrode and effective electrical connection therewith for the transfer of high frequency energy to the material therethrough as required.

In any case, each of the electrodes is effectively provided with a slight degree of freedom of movement at and along its operating surface or line of contact with the work, whereby appreciable warpage of the electrode proper is prevented.

Referring now to Figures 3 and 4, the electrodal structure is of an H-beam or channel form providing a high degree of rigidity for bar electrodes of extreme length as may be desired for the welding of extremely long seams between thin sheets of thermoplastic material such as the edges of plastic raincoats and the like.

In the present embodiment of the invention, the upper electrode is an elongated metallic bar or rib 30 tapered to a relatively narrow operating edge 31 and is formed integral with a wider base 32, by which it is secured to one face of a deformed H-beam 33.

The lower electrode is provided by a similar elongated bar or rib 34 having a relatively narrow electrodal face or edge 35 and being integral with a relatively wide base or flange 36, by which it is mounted on an elongated H-beam 37. A strip of suitable insulating metal, indicated at 38, is interposed between the base of the lower electrode and the beam 37 to insulate the electrode from ground. The upper electrode is connected to ground through direct contact with the beam 33. R.-F. energy from a high frequency generator is applied to the electrodes through suitable supply leads indicated at 40. The electrodes 30 and 34 are arranged to operate in a vertical plane one with respect to the other to engage and unite the sheets of thin thermoplastic material indicated at 41 and 42 in the same manner as described in connection with the preceding embodiment, the heating being applied along a line of contact between the electrodes to provide an elongated linear seal or weld between the thermoplastic sheets.

In the present embodiment, the electrodes are provided with a thin metallic strip directly carried thereby. The face 31 of the electrode 30 is covered by a thin metallic strip or sheet 45 extending along the full operating length of the electrode and is bent to conform with the shape of the electrode face or edge and is retained in position by seating the edges of the strip in suitable parallel grooves in the sides of the electrode as indicated at 46 and 47.

The electrode cover or shield 48 for the electrode 34 is of similar construction, being a thin metallic strip extending along the full operating length of the lower electrode and having its edges secured in grooves in the sides of the electrode as indicated at 49 and 50. Any other suitable arrangement may be provided whereby the electrode faces or edges may be covered by thin metallic sheets mechanically applied thereto in a position for free expansion and contraction in substantially all directions to impart to the active electrode surface areas a degree of freedom of movement without warping of the electrode proper by the transmission thereto of the heat generated in the welding operation.

Effectively the thin metallic sheets provide a filler between the electrode and the work at the point of contact or a protective cover of a few mils in thickness to provide a freely expansible and contractable "skin" for each electrode. As in the preceding embodiment, the electrode covers or sheets may be of copper of the order of 5 mils in thickness, although other suitable metals may be used as desired.

In the present embodiment, the lower electrode is fixed while the upper electrode is movable with respect thereto to engage the plastic sheets for welding and for removing the work therefrom. Figure 3 shows the operating arrangement for raising and lowering the upper electrode and guiding its movement with respect to the lower electrode.

Referring more particularly to Figure 3, the lower electrode is mounted between the ends 55 and 56 of a U-shaped frame 57, being secured to vertical, spaced guide members one of which is shown at 58, having an inwardly extending rib 59 to which the beam 37 is attached by means of side plates 60, in fixed position.

The upper beam is provided with similar side plates 61 which extend therefrom on opposite sides of guide rib 59 to guide the beam in a vertical direction as it is moved toward and away from the lower beam and the lower electrode.

In the present example, the upper electrode and beam 33 are moved by means of air cylinders 62 connected with the beam through operating rods 63 and electrically controlled by means of push button switches indicated at 64 and 65. The latter are operated to raise and lower the beam and the upper electrode. As any suitable control system may be provided for operating the electrodes and forms no part of the present invention, further description is believed to be unnecessary.

It is desirable that as the upper electrode is lowered for operation the high frequency power supply for the leads 40 be energized. For this purpose a switch indicated at 66 is provided in the apparatus shown, having power control leads 67 and an adjustable mechanical operating connection 68 with the movable beam 33. In this arrangement as the beam is lowered the switch 66 is closed by the mechanical connection 68 carried by the beam. Any suitable control arrangement may, however, be provided for this purpose.

It has been found desirable under certain working conditions for the high frequency sealing of certain thin thermoplastic sheet materials, to provide a laminated electrode cover comprising more than one sheet of thin copper or other metal and such an arrangement is shown in Figure 5 to which attention is now directed.

In this arrangement it will be seen that the upper electrode 8 of the system shown in Figures 1 and 2, is provided with two sheets of copper or other metal as indicated at 70 and 71 which are retained in position over the electrode face by the guide strips 26 which are suitably spaced from the electrode to permit the edges of the strips to be inserted and held, thereby providing a laminated sheet or cover for the electrode 8.

The lower electrode is shown with a single layer of metal over the electrode face, although it is obvious that it may also be so provided with a laminated structure as in the case of the electrode 8 to provide further protection against the transfer of heat at the instant of welding and thereby warpage of the electrode.

It has been found that by the use of a laminated cover comprising two layers of thin sheeting, the warpage of the main electrode or electrode proper may be reduced substantially to zero where the welding or uniting of thermoplastic sheets must be highly uniform, as may be desired in making seams which must be liquid tight in certain cases.

While the invention has been shown and described in connection with certain preferred forms of electrodes, it is obvious that it may be applied to any form of elongated electrode or electrodal arrangement for the production of long seams or welds between two sheets of thermoplastic material. It is essential, however, in accordance with the invention, that the metallic filler or sheet between the electrode proper and the work, along the line of the seam or weld, be relatively thin and in contact with the electrode to apply pressure to the work through the electrode while at the same time providing a relatively movable "skin" which is substantially freely expansible and contractable in substantially all directions without stress on the electrode and for preventing the instantaneous flow of heat thereto during the welding operation.

In any case, however, the construction is such that the speed of the heat seal is greater than the speed of the heat travel through the protective coating, whereby the electrode face is maintained relatively cool during the substantially instantaneous welding operation and presents a surface to the seam which is uniform. Any heat which the electrode may receive by conduction from the protective cover after the seal is completed is rapidly dissipated by radiation so that any warpage which occurs is slight and ineffective to impair the seal. It may be considered that, in operation, the welding may occupy a time interval of the order of $\frac{1}{10}$ of a second and the subsequent operations in removing the sealed sheets and replacing them with new material for sealing may occupy a much longer period of the order of from 5 to 10 seconds. In practice this has been found to be sufficient time for the electrodes to cool and be restored to their normal form at the operating edge.

Therefore, the protective cover permits continuous normal operation of the device regardless of the heat developed at the weld since the heat at the instant of welding is prevented from flowing to the electrode proper.

What is claimed is:

1. An electrode for high frequency sealing of thin thermoplastic sheet materials comprising an elongated metallic bar having an operating surface extending along the length of said bar for engaging the work, a thin metallic sheet of the order of a few mils in thickness in contact with and covering said operating surface, said sheet being separate from said electrode proper and being movable over said operating surface to provide a heat protective expansible and contractable protective "skin" therefor, and guide means carried by said bar for freely retaining said sheet on said operating surface.

2. An electrode for high frequency heating of thermoplastic sheet materials, comprising an elongated metallic bar having an operating surface extending along the length thereof for the application of heat over relatively narrow areas over linear dimensions of extended length, a laminated heat protective cover for said operating surface and in substantially uniform contact therewith comprising a plurality of relatively thin metal sheets being separate from said metallic bar and movable over said operating surface and guide means carried by the bar for freely engaging the edges of said sheets whereby the cover is freely expansible and contractable in response to heat, and said bar having a relatively large cross sectional area and weight, thereby to apply effective sealing pressure to the work through said cover.

3. An electrode structure for high frequency heating of thermoplastic sheet materials, comprising an elongated bar electrode having an operating surface extending along the length thereof for the generation of heat over relatively narrow areas of substantially linear dimensions and extended length, a heat protective cover for said operating surface comprising a relatively thin metal sheet separate from said electrode and movable over said operating surface, and guide means carried by the electrode for freely engaging the edges of said sheet, whereby said cover is freely expansible and contractable in response to heat of operation.

4. A high frequency heating electrode structure comprising a pair of elongated metallic bar electrodes for engaging and holding thermoplastic sheet material therebetween for uniting the same by sealing over areas of substantially linear dimensions and of extended length, said electrodes having operating faces for engaging said work comprising protective metal covers of thin metallic sheet material separable from and movably retained on said electrodes for confining heating to said electrode faces in operation, thereby to prevent distortion of said electrodes and uneven sealing of said material.

5. In a high frequency heating apparatus for thin thermoplastic sheet material, an elongated bar electrode having a working surface for applying high frequency energy to material to be heated, and a thin metallic protective cover applied to said electrode in substantially uniform contact therewith over its working surface, said metallic cover being separable from said electrode and being retained thereby to be freely expansible and contractable over said working surface.

6. In a high frequency heating apparatus for thin thermoplastic material, an elongated bar electrode having an extended substantially linear working surface for applying high frequency energy to material to be heated, a thin metallic protective cover on said electrode in substantially uniform contact therewith over its working surface, said cover being separate from the electrode proper and being freely expansible and contractable uniformly in substantially all directions in the presence of heat in operation, and guides carried by the electrode for freely retaining said cover in position thereon.

7. In a high frequency heating apparatus for thin thermoplastic material, an elongated bar electrode having an extended substantially linear working surface for applying high frequency energy to material to be heated, a thin protective cover applied to said electrode in substantially uniform contact therewith over its working surface, said cover comprising a plurality of thin metallic sheets being separate from the electrode proper and being freely expansible and contractable uniformly in substantially all directions in the presence of heat in operation, and guides carried by the electrode for freely engaging the edges of said sheets to restrain said cover to uniform contact with the electrode, and to provide effective electrical connection therewith for the transfer of high frequency energy therethrough.

8. An electrode structure for high frequency sealing of thin thermoplastic sheet material, comprising a pair of elongated bar electrodes arranged in substantially parallel relation to each other, a support for rigidly holding one of said electrodes in fixed position, a control element connected with the other of said electrodes for imparting movement thereto, a guide structure for controlling the direction of movement of said movable electrode toward and away from said fixed electrode for engaging thermoplastic sheet material therebetween for sealing along an extended narrow area between said electrodes, and a thin free metallic sheet providing the outer operating surface of each of said electrodes, each of said sheets being separate from said electrodes and being retained by said electrodes to have freedom of movement at and along the operating surface and line of contact with the work with respect to the electrode proper, in response to heat of operation, whereby appreciable warpage of the electrode proper is prevented.

9. An elongated electrode structure for high frequency heating of thermoplastic material having an operating face to contact said material and having means to prevent the heat from said material from warping said elongated electrode, said means comprising at least one, thin, metallic sheet covering and in substantial contact with the operating face of said electrode, said sheet being separable from said electrode and mountable thereon to be freely expansible and contractable over said operating surface in the presence of heat from said material.

THEODORE H. STORY.

REFERENCES CITED

The following references are of record in the file of this patent:

UNITED STATES PATENTS

| Number | Name | Date |
|---|---|---|
| 1,267,463 | Schkommodau | May 28, 1918 |
| 1,300,068 | Weed | Apr. 8, 1919 |
| 1,330,563 | Weed | Feb. 10, 1920 |
| 2,320,920 | Fletcher | June 1, 1943 |

FOREIGN PATENTS

| Number | Country | Date |
|---|---|---|
| 572,662 | Germany | Mar. 20, 1933 |

OTHER REFERENCES

Wenger, "Heat Sealing Thermoplastics," Modern Plastics, July 1946, pages 135–139, particularly page 138.